July 28, 1942.  L. L. ANTHONY  2,291,200
RESILIENT SUPPORT FOR TRACTOR SEATS
Filed Feb. 8, 1940  2 Sheets-Sheet 2
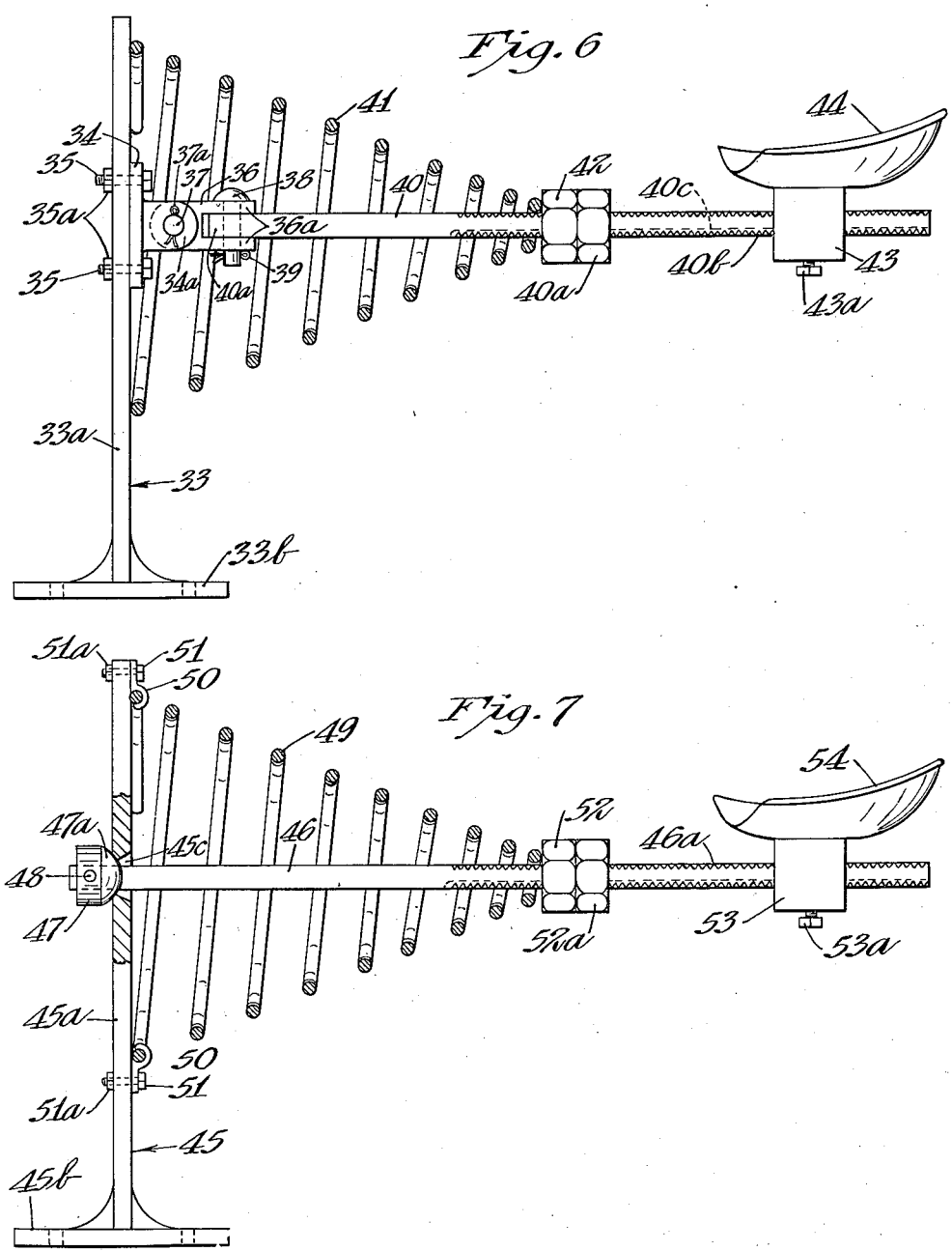
Inventor
Lucius L. Anthony
By Williamson & Williamson
Attorneys Patented July 28, 1942

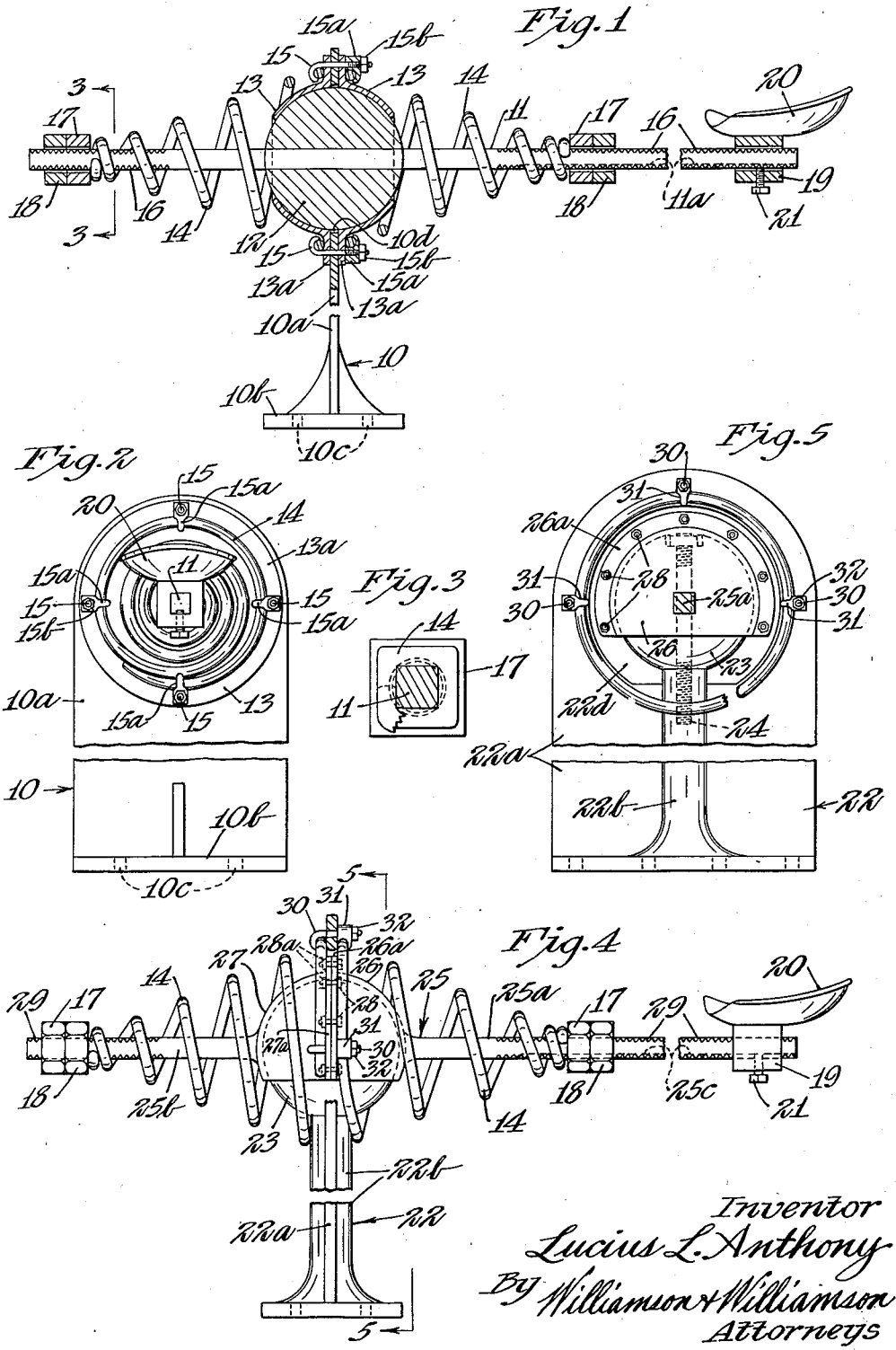

2,291,200

UNITED STATES PATENT OFFICE 2,291,200

RESILIENT SUPPORT FOR TRACTOR SEATS

Lucius L. Anthony, Decatur, Mich.

Application February 8, 1940, Serial No. 317,863

13 Claims. (Cl. 155—51)

My invention relates to tractor seats and particularly to shock-absorbing supports therefor.

In tractors and other implements and machines having a driver's or operator's seat, it is common to provide a seat support which is capable of absorbing or diminishing shocks working in a vertical direction but such construction does not relieve the user of the seat from shocks working sidewise of the tractor or implement such as are caused by the tractor or implement lurching sidewardly due to striking of ruts or various kinds of obstructions.

An object of my invention is to provide a tractor seat support which is capable of resiliently yielding in not only a vertical direction but also in a horizontal direction and in intermediate directions.

Another object is to provide such a tractor seat support having an elongated seat supporting arm mounted for swinging movements laterally thereof in vertical and horizontal directions and in combinations of these directions, and resilient means for yieldingly holding said arm in a normal position thereof.

Yet another object is to provide such a seat support including means for adjusting the strength of the resilient means to accommodate the support for use of persons of various weights.

Still another object is to provide such a seat support constructed to enable adjustment of the seat thereon to suit the support for use of persons having legs of various lengths and arranged to include positive means for maintaining a seat carried thereby in an upright position.

A further object is to provide such a support wherein the adjustments for adapting the support for use by persons of various weights and proportions may be quickly and easily made.

A still further object is to provide such a seat support of simple, light, compact, rugged and inexpensive construction.

These and other objects and advantages of the invention will more fully appear from the following description made in connection with the accompanying drawings, wherein like reference characters refer to the same parts throughout the views, and, in which:

Fig. 1 is a vertical sectional view of an embodiment of my invention with a seat shown in operative relation therewith;

Fig. 2 is a rear end view;

Fig. 3 is a sectional view taken on the line 3—3 of Fig. 1 as indicated by the arrows;

Fig. 4 is a side view of a slightly different embodiment of my invention;

Fig. 5 is a sectional view taken on the line 5—5 of Fig. 4 as indicated by the arrows;

Fig. 6 is a longitudinal sectional view of a simplified form of my seat support; and Fig. 7 is a longitudinal sectional view of another simplified form of my seat support.

Referring to the drawings and particularly to Figs. 1 to 3 inclusive, I provide a body or member which is intended to be mounted on a tractor or other implement or machine in rigid and stationary relation thereto and which may consist of an upstanding bracket such as the bracket 10 of Figs. 1 to 3. The bracket 10 includes a vertical plate 10a disposed in a plane normal to the direction of travel of the vehicle or machine upon which it is mounted. At the lower end of the plate 10a a base 10b is provided having mounting holes 10c therein to facilitate mounting of the bracket 10 by suitable means such as bolts or the like. The upper portion of the plate 10a of the bracket 10 is provided with a relatively large aperture 10d therein and the upper end of the plate 10a is preferably rounded as shown in the drawings. It is to be noted that in cases where my seat support is to be incorporated in a vehicle or machine including in its structure a suitably situated member constituting an equivalent of the plate 10a, such structural member may be used in lieu of the bracket 10 and would be considered the equivalent thereof in a combination constituting an embodiment of my invention.

I provide an elongated member 11 suited for attachment of a seat to one end thereof and swingably connected at a point thereon remote from said one end to the bracket 10 for swinging movement relative thereto in vertical, horizontal and intermediate directions. While various types of connecting means meeting the requirements of my device may be employed for connecting the member 11 to the bracket 10, I show in Figs. 1 to 3 a ball and socket joint for the purpose which will be described later. The member 11 is a bar of relatively rigid and strong material, preferably with a polygonal cross-sectional shape, and is shown in the drawings as having a square cross-sectional shape.

At the medial portion of the member or bar 11 the same is provided with one of the respective ball and socket elements of a ball and socket joint. In Figs. 1 to 3, I show a ball element 12 placed on the medial portion of the bar 11 as by forming a diametrical aperture through the ball 12 and extending the bar 11 therethrough. The bar 11 may be either secured or longitudinally slidable in the ball element 12 as desired.

Flanged and centrally apertured half socket elements 13 are provided to fit the ball 12. The diameter of the ball 12 and the internal diameter of the pair of half socket elements 13 are made slightly less than the diameter of the circular aperture 10d of the plate 10a. The half socket elements 13 are placed at opposite sides of the plate 10a in enclosing relation with the ball 12 and with the flanges 13a thereof against opposite sides of the portions of the plate 10a encircling the aperture 10d of the plate 10a. A series of bolt holes are formed in the flanges 13a and the plate 10a so that bolts or the equivalent may be used to secure the half socket elements 13 to the plate 10a.

Resilient means is provided to normally maintain the bar 11 in a predetermined position which, in the embodiment of my invention shown in Figs. 1 to 3, is indicated as being a horizontal position, and to resistingly permit deflection of the bar from its normal position in vertical, horizontal and intermediate directions. For this purpose I provide at least one compression spring 14 which is preferably helically wound and of conical shape so as to have a relatively large base and an apex portion of relatively small dimension. In the embodiment of Figs. 1 to 3 I show two such springs although one spring of sufficient strength situated in the location of either one of the springs shown could be used alone to accomplish the required function. The springs 14 are disposed co-axially of the bar 11 with their bases toward the bracket plate 10a and their apices spaced outwardly of the plate 10a at opposite sides thereof. The bracket plate 10a serves as a base of resistance for the springs 14 and, in the particular construction shown in Figs. 1 to 3, the flanges 13a of the half socket elements 13 are interposed between the bases of the springs 14 and the plate 10a. The bases of the springs 14 are secured to the bracket plate 10a to prevent rotation of the springs relative thereto about the axes of the springs 14. For this purpose I provide J-bolts 15 equipped with clips 15a and nuts 15b. The hooked ends of the J-bolts are hooked on the first convolution at the base end of one of the springs 14 and the shanks of the J-bolts are extended through the bolt holes in the flanges 13a and the plate 10a. The clips 15a are placed on the free end portions of the J-bolts 15 and engaged with the first convolution at the base end of the remaining one of the springs 14. The nuts 15b are then placed on the free ends of the J-bolts 15 and tightly screwed thereon to clamp together the bases of the two springs 14, the two flanges 13a and the plate 10a.

The free ends or apices of the springs are associated with the bar 11 in closely encircling and non-rotative relation therewith and with such a fit as to be slidable on the bar 11 longitudinally thereof. To provide such a relation of the springs 14 with the bar 11 the apex portions of the springs 14 are wound with square turns so as to closely fit the square peripheral shape of the bar 11.

Means is provided on the bar 11 constituting abutments for engaging the free ends of the respective springs 14 and maintaining the springs 14 in partially compressed condition. The bar 11 is provided with notches in the corners thereof throughout the vicinities of the free ends of the springs 14 constituting external screw threads 15, and nuts 17 backed by locknuts or jam nuts 18 are placed on each of the sets or series of threads 15 immediately outwardly of the free ends of the respective springs 14 and are drawn up to partially compress the springs 14. It should be apparent that the degree of compression of the springs 14 may be varied by manipulation of the nuts 17 and 18.

The right end of the bar 11, as viewed in Fig. 1, is extended outwardly of the ball 12 to a considerably greater distance than the left-hand end and is intended for mounting of a seat thereon. Mounting means for a seat adjustably movable longitudinally of the bar 11 is provided on the right-hand end portion of the bar 11. This mounting means consists preferably of a block 19 which is cylindrically apertured and internally screw-threaded. To accommodate mounting of the block 19 thereon the bar 11 is provided with screw thread-forming notches 16 not only in the vicinity of the right-hand nut 17 and locknut 18 but also continuing from said vicinity to the right-hand extremity of the bar 11. The block 19 is screw-threadedly mounted on the right-hand end portion of the bar 11 and may be screwed back and forth therealong for the purpose of adjustably positioning the block 19 on the bar 11. A seat such as the seat 20 may be secured to the block 19 as indicated in Fig. 1 and means is provided for releasably locking the block 19 in an adjusted position on the bar 11 with the seat 20 in an upright position. Since the springs 14 are clamped at their bases to the bracket plate 10a to be non-rotatable relative thereto and the square shaped apex portion of each spring 14 closely fits the square bar 11 to prevent rotation of the bar 11 relative to the springs 14, it should be clear that the bar 11 is restrained from rotation. The block 19 is radially apertured and internally screw-threaded and is provided in its screw-threaded portion with a set screw 21 to engage one of the faces of the bar 11 when the seat 20 is in an upright position. If desired the lower side of the bar 11 may be provided with a longitudinal slot such as the slot 11a for receiving the inner end of the set screw 21. Preferably the bar 11 is positioned with a face thereof at the lower side thereof disposed in a horizontal plane and the set screw 21 is screwed upwardly into the block 19 from the lower side thereof. Loosening of the set screw 21 enables swinging of the block 19 and the seat 20 around the bar for adjustively positioning the seat 20 relative to the length of the bar 11 and re-tightening of the set screw 21 with the seat 20 in an upright position engages the inner end of the set screw 21 with a flat face of the square bar 11 so that the effectiveness of the set screw is not dependent upon its frictional engagement with or cutting into the bar 11.

Figs. 4 and 5 show an embodiment of my invention identical with the embodiment of Figs. 1 to 3 except that the ball of the ball and socket joint is mounted on the bracket and the socket element is formed in the medial portion of the deflectible seat supporting bar.

In Figs. 4 and 5 the bracket 22 is generally similar to the previously described bracket 10 except that the vertical plate 22a thereof is provided with a centrally located, vertically extending re-enforcement or thickened portion 22b which projects a short distance upwardly into the aperture 22d (Fig. 5) of the bracket plate 22a. A ball 23 is mounted on the upper end of the upward projection of the thickened portion 22b by means such as the screw threaded rod or stud 24 (Fig. 5) which is threaded into both the ball 23 and the upward projection of the thickened portion 22b. The deflectible seat-carrying bar 25 is divided at its medial portion to form right and left-hand sections 25a and 25b. The inner ends of the bar sections 25a and 25b are provided with respective ones of a pair of ball socket element halves 26 and 27 which are cut away in their lower portions and which are provided with apertured flanges 26a and 27a. The two socket halves are placed in enclosing relation with the ball 23 and are joined together by bolts 28 and nuts 28a applied to the apertured flanges 26a and 27a. In the same manner as in the embodiment of Figs. 1 to 3 the end portions of the bar 25 are provided with notches 29 forming external screw threads. Nuts 17, locknuts 18, a block 19 and a seat 20, identical with the same elements in Fig. 1 are placed on the threaded portions of the bar 25 in the same manner as on the threaded portions of the bar 11 of Fig. 1. The block 19 is provided with a set screw 21 and, if desired, the lower side of the bar 25 may be provided with a longitudinal slot for receiving the inner end of the set screw 21. Springs 14, the same as those in Fig. 1, are clamped to the bracket plate 22a by means of J-bolts 30, clips 31 and nuts 32 in a manner similar to the manner in which the bases of the springs 14 of Fig. 1 were clamped to the bracket plate 10a. The apices of the springs 14 are associated with the bar 25 in the same manner as with the bar 11 of Fig. 1.

In Fig. 6 I have shown a simplified and particularly inexpensive form of my seat support. This form includes a bracket 33 consisting of a vertical plate 33a having a base 33b on the lower end thereof. A small plate 34 carrying a pair of spaced, parallel apertured lugs 34a is secured to the rear side of the central portion of the plate 33a by suitable means such as the bolts 35 and nuts 35a. A clevis member 36 is apertured at the left-hand end thereof and pivotally connected thereat to the apertured lugs 34a by means of a headed pivot pin 37 held in place by a cotter key 37a inserted in the diametrically apertured free end thereof. The clevis member 36 has, at its right-hand end, a pair of spaced, parallel, apertured lugs 36a through which a headed pivot pin 38 extends and is held in place by a cotter key 39 inserted in the diametrically apertured free end thereof. A bar 40 which may be of round cross-sectional shape, is provided, at its left-hand end with an eye 40a which is pivotally mounted on the pivot pin 38. The bar 40 is screw-threaded in its medial portion and the screw threads 40b extend to the free end extremity of the bar 40. A helically wound conical spring 41 disposed co-axially of the bar 40 has a relatively large base end bearing against the bracket plate 33a and an apex portion closely encircling the medial portion of the bar 40. A nut 42 and a locknut 42a are placed on the bar 40 immediately upwardly of the apex of the spring 41 and are drawn up to partially compress the spring 41. An apertured and internally screw threaded seat-supporting block 43 is screwed onto the free end portion of the bar 40 and carries a seat 44 suitably secured thereto. The block 43 is provided with a set screw 43a and the lower side of the bar 40 is provided with a longitudinal groove 40c for receiving the inner end of the set screw 43a.

In Fig. 7, I show another simplified and particularly inexpensive form of my seat support including a bracket 45 including a vertical plate having a base 45b at the lower end thereof and being provided with an aperture 45c in the central portion thereof. The apertured portion is countersunk at both the front and rear sides thereof, the countersinking at the rear side being somewhat deeper than the countersinking at the front side. A bar 46 is extended at its forward end through the aperture 45c and carries, immediately forwardly of the plate 45a, an enlarged element 47 secured thereon by suitable means such as the pin 48 and having a hemispherical face 47a bearing against the countersunk portion of the front side of the plate 45a. The bar 46 is provided, in the medial and free end portions thereof, with notches 46a in the corners thereof constituting a screw thread. A helically wound conical compression spring 49 disposed co-axially of the bar 46 has a relatively large base end bearing against the bracket plate 45a and an apex end closely encircling the medial portion of the bar 46 and having a square cross-sectional shape so as to be non-rotatable relative to the bar 46. The base end of the spring 49 is secured to the bracket plate 45a against rotation relative thereto by suitable means such as the clips 50 which are attached to the bracket plate 45a by bolts 51 and nuts 51a as shown. A nut 52 and a locknut 52a are screwed onto the bar 46 immediately outwardly of the apex end of the spring 49 and are drawn up to partially compress the spring 49. An apertured and internally screw-threaded seat-supporting block 53 carrying a seat 54 is screwed onto the free end portion of the bar 46 and is provided with a radially disposed set screw 53a, the inner end of which is engageable with the lower face of the periphery of the bar 46 to lock the block 53 against rotation relative to the bar 46 when the seat 54 is in an upright position.

It is apparent that I have invented a novel, light, compact, rugged and effective support for tractor seats capable of absorbing shocks in vertical, horizontal and intermediate directions and arranged for quick and easy adjustment to suit users of various weights and leg lengths.

It will, of course, be understood that various changes may be made in the form, details, arrangement and proportions of the various parts without departing from the scope of my invention.

What is claimed is:

1. A shock-absorbing seat support comprising, a generally horizontal elongated member having one end capable of having a seat mounted thereon, a bracket, said member being swingably connected to said bracket at a point on said member spaced from said one end thereof in a manner enabling swinging movements of said member vertically and horizontally, and a coil spring anchored to said bracket and encircling said member and yieldably restraining said member from said movements.

2. A shock-absorbing seat support comprising, a generally horizontal elongated member having one end capable of having a seat mounted thereon, a bracket, means swingably connecting said member, at a point thereon remote from said one end, to said bracket for vertical and horizontal swinging movements, a helically wound conical spring disposed co-axially of said member and having a base of large diameter relative to said member bearing against said bracket, the free end of said spring being arranged in closely encircling relation with said member, and an abutment element mounted on said member to abut the free end of said spring and maintain said spring partially compressed.

3. A shock-absorbing seat support comprising, a bracket having a generally horizontal aperture therethrough, an elongated member having one end suited for mounting a seat thereon and, at a point remote from said one end, projecting through the aperture of said bracket, means swingably connecting said member to the apertured portion of said bracket for swinging movement in all directions normal to said member, a helically wound conical spring disposed co-axially of said member and having a relatively large base bearing against said bracket, the free end of said spring being in closely encircling relation with said member, and an abutment element mounted on said member to abut the free end of said spring and maintain said spring partially compressed.

4. A shock-absorbing seat support comprising, a generally horizontal elongated member having one end capable of having a seat mounted thereon, a bracket, means swingably connecting said member, at a point thereon remote from said one end, to said bracket for vertical and horizontal swinging movements, a helically wound conical spring disposed co-axially of said member and having a base of large diameter relative to said member bearing against and secured to said bracket, the free end of said spring being in closely encircling relation with said member, and an adjustably movable abutment element mounted on said member at the free end of said spring and situated on said member to maintain said spring partially compressed.

5. A shock-absorbing seat support comprising, a generally horizontal elongated member having one end capable of having a seat mounted thereon, a bracket, means swingably connecting said member, at a point thereon remote from said one end, to said bracket for vertical and horizontal swinging movements, a helically wound conical spring disposed co-axially of said member and having a base of large diameter relative to said member bearing against and secured to said bracket, said member being of polygonal cross-sectional shape in the vicinity of the free end of said spring, the free end of said spring being in closely encircling relation with said member and wound to a cross-sectional shape fitting the polygonal periphery thereof, and an abutment element mounted on said member at the free end of said spring and situated on said member to maintain said spring partially compressed.

6. A shock-absorbing seat support comprising, a generally horizontal elongated member having one end capable of having a seat mounted thereon, a bracket, means swingably connecting said member, at a point thereon remote from said one end, to said bracket for vertical and horizontal swinging movements, a helically wound conical spring disposed co-axially of said member and having a base of large diameter relative to said member bearing against and secured to said bracket, said member, in the vicinity of the free end of said spring, being of polygonal cross-sectional shape and having notches at its corners forming a screw thread thereon, the free end of said spring being in closely encircling relation with said member and wound to a cross-sectional shape fitting the polygonal periphery thereof, and an internally screw-threaded abutment element screw-threadedly mounted on the screw-threaded portion of said member for abutting the free end of said spring and maintaining the same partially compressed.

7. A shock-absorbing seat support comprising, a generally horizontal elongated member having one end suited for having a seat mounted thereon, a bracket, means swingably connecting said member at a point thereon remote from said one end, to said bracket for vertical and horizontal swinging movements, a helically wound conical spring disposed co-axially of said member and having a relatively large base bearing against said bracket and an apex spaced toward said one end of said member from said bracket, said member having a series of external screw threads thereon extending throughout the vicinity of said apex and continuing to said one end of said member, a nut screwed on said threads to abut said apex and maintain said spring partially compressed, an internally screw-threaded element arranged for mounting of a seat thereon screwed onto the outer end portion of said series, and releasable means associated with said last mentioned element for normally restraining the same from rotation relative to said member.

8. The combination defined in claim 7 and, said member being of polygonal cross-sectional shape, and a set-screw threaded radially into said last mentioned element for engaging a face of the periphery of said member when a seat carried by said last-mentioned element is in upright position.

9. A shock-absorbing seat support comprising, a generally horizontal elongated member having one end suited for having a seat mounted thereon, a bracket, said member being swingably connected to said bracket at a point on said member remote from said one end thereof in a manner enabling swinging movements of said member vertically and horizontally, means for yieldably restraining said member from said movements away from a pre-determined position of said member, said one end of said member being of polygonal cross-sectional shape and having notches formed in the corners of its periphery to constitute screw threads, an internally screw threaded element arranged for mounting of a seat thereon screwed onto said threads, and a set-screw threaded radially into said last-mentioned element for engaging a face of the periphery of said member when a seat carried by said last-mentioned element is in upright position.

10. A shock-absorbing seat support comprising, a generally horizontal elongated member having one end capable of having a seat mounted thereon, a bracket, a ball and socket assembly having respective ball and socket elements, one of said elements being fixed on said bracket and the other being formed on said member with its center fixed on the axis thereof at a point spaced from said one end, a helically wound spring disposed co-axially of said member and having a base of large diameter relative to said member secured to said bracket, and means on said member for limiting outward movement of the free end of said spring relative to said member, said means being so situated as to maintain said spring in partially compressed relation, the free end of said spring being associated with said member in radially unshiftable relation therewith.

11. A shock-absorbing seat support comprising, a generally horizontal elongated relatively rigid member having one end capable of having a seat mounted thereon, a bracket, a ball and socket assembly having respective ball and socket elements, one of said elements being fixed on said bracket and the other being formed at the medial portion of said member with its center fixed on the axis thereof, a pair of helically wound conical springs disposed co-axially of said member and connected at their bases to said bracket to extend oppositely therefrom, and means on said member for limiting outward movement of the free ends of said springs relative to said member, said means being so situated as to maintain said springs in partially compressed condition, the free ends of said springs being in closely encircling relation with said member.

12. A shock-absorbing seat support comprising, a generally horizontal elongated relatively rigid member having one end capable of having a seat mounted thereon, a ball and socket assembly including a ball element and a socket element, a bracket on which one of said elements is secured, the other of said elements being secured on the medial portion of said member with its center at the axis thereof, a pair of helically wound conical springs disposed co-axially of said member and connected at their bases to said bracket to extend in opposite directions therefrom, and abutment elements secured on said member to engage the free ends of said springs and maintain said springs in partially compressed condition.

13. A shock absorbing seat support comprising a substantially horizontal elongated member having one end adapted to support a seat, means connected to and supporting said member at a point remote from said one end and permitting vertical and horizontal swinging of said member, comprising a relatively stationary spring support adjacent said elongated member, and spring means having a portion substantially rigidly connected to said spring support, said spring means lying about said elongated member and having a portion secured to said elongated member to yieldably restrain said seat and member against swinging movement.

LUCIUS L. ANTHONY.